(12) United States Patent
Liu (10) Patent No.: US 10,936,707 B2
(45) Date of Patent: Mar. 2, 2021

(54) FINGERPRINT CIRCUIT, FORCE TOUCH CONTROL METHOD AND DEVICE AND COMPUTER-READABLE STORAGE MEDIUM (71) Applicant: BEIJING XIAOMI MOBILE SOFTWARE CO., LTD., Beijing (CN)

(72) Inventor: Nan Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/111,794

(22) Filed: Aug. 24, 2018

(65) Prior Publication Data

US 2019/0064989 A1 Feb. 28, 2019

(30) Foreign Application Priority Data

Aug. 25, 2017 (CN) .......................... 201710739867.2

(51) Int. Cl.
*G06F 3/041* (2006.01)
*G06K 9/00* (2006.01)
(Continued)

(52) U.S. Cl.
CPC ............ *G06F 21/32* (2013.01); *G06F 3/0325* (2013.01); *G06K 9/0002* (2013.01);
(Continued)

(58) Field of Classification Search
CPC ...... G06F 3/0414; G06F 3/0325; G06F 21/32; G06K 9/0002; G06K 9/0004; G06K 9/00053; H01L 27/14643
See application file for complete search history.

(56) References Cited

U.S. PATENT DOCUMENTS

| 2010/0277431 A1* | 11/2010 | Klinghult | G06F 3/0412 345/174 |
| 2011/0054937 A1* | 3/2011 | Dibble | G06F 17/243 705/3 |
| 2017/0255269 A1* | 9/2017 | Yang | G06F 3/016 |

FOREIGN PATENT DOCUMENTS

| CN | 104680162 A | 6/2015 |
| CN | 105302373 A | 2/2016 |

(Continued)

OTHER PUBLICATIONS

Machine translation of CN 106445242 (Year: 2019).*

(Continued)

*Primary Examiner* — Michael Pervan
(74) *Attorney, Agent, or Firm* — Arch & Lake LLP (57) ABSTRACT

A fingerprint circuit, and a force touch control method and a device are provided. The fingerprint circuit includes a circuit cover plate, a fingerprint sensor, a light source and an optical sensing device. A specular reflection layer is arranged below the circuit cover plate. The light source, the optical sensing device and the fingerprint sensor are positioned below the specular reflection layer. The light source and the optical sensing device are positioned on two sides of the fingerprint sensor respectively. Light emitted by the light source passes through a gap between the fingerprint sensor and the circuit cover plate to irradiate the specular reflection layer and is reflected to the optical sensing device through the specular reflection layer. The optical sensing device converts the light reflected by the specular reflection layer into an electrical signal, and the electrical signal may be configured for force touch control.

15 Claims, 5 Drawing Sheets

(51) Int. Cl.
    *G06F 21/32*     (2013.01)
    *G06F 3/03*      (2006.01)
    *H01L 27/146*    (2006.01)
(52) U.S. Cl.
    CPC ....... *G06K 9/0004* (2013.01); *G06K 9/00053* (2013.01); *H01L 27/14643* (2013.01)

(56)      References Cited

FOREIGN PATENT DOCUMENTS

| CN | 106445242 A  | 2/2017 |
| KR | 20020037485 A | 5/2002 |
| KR | 100393019 B1 | 7/2003 |

OTHER PUBLICATIONS

Machine translation of KR 20020037485 (Year: 2019).*
Machine translation of CN 104680162 (Year: 2019).*
European Extended Search Report issued in corresponding EP Patent Application No. 18190711.4, dated Dec. 10, 2018, 10 pages.
First Office Action issued to Chinese Application No. 201710739867.2, dated Feb. 18, 2020 with English translation (15p).

* cited by examiner

FINGERPRINT CIRCUIT, FORCE TOUCH CONTROL METHOD AND DEVICE AND COMPUTER-READABLE STORAGE MEDIUM

CROSS-REFERENCE TO RELATED APPLICATIONS

This application is filed based upon and claims priority to Chinese Patent Application of International Application No. 201710739867.2, filed on Aug. 25, 2017, the entire contents of which are incorporated herein by reference.

TECHNICAL FIELD

The present disclosure generally relates to terminals, and more particularly, to a fingerprint circuit, a force touch control method and device and a computer-readable storage medium.

BACKGROUND

Users prefer terminal products that can be used with simplicity and convenience. Accordingly, a design for the terminal product has been developed from conventional realization of a single function to aesthetics and integration. A conventional physical key is gradually disappearing from sights of consumers, and each major terminal manufacturer is actively trying a "keyless" design of mobile phones. Emergence of force touch control undoubtedly provides a sufficient technical support for such a design concept. Since fingerprint recognition has become an indispensable configuration of a terminal product. Integrating a force touch function into a fingerprint circuit becomes a feasible technical solution provided for integration of a terminal product and diversification of functions at present.

In a design provided in a related technology, a force touch function is integrated based on a capacitive fingerprint circuit. A Flexible Printed Circuit (FPC) is led out from an existing capacitive fingerprint circuit. A middle frame of the whole machine is determined as a reference ground. A capacitor C is formed between the FPC and the middle frame, and changes in capacitance of the capacitor are related to a distance between the FPC and the middle frame. When the fingerprint circuit is pressed with a finger, a difference of pressing forces may change the distance between the FPC of the fingerprint circuit and the middle frame, and a change of the capacitance between the FPC and the middle frame may be detected to detect a magnitude of a force applied to the fingerprint circuit and further realize the force touch function.

SUMMARY

According to a first aspect of the present disclosure, a fingerprint circuit is provided, which may be applied to a terminal and include: a circuit cover plate, a fingerprint sensor, a light source and an optical sensing device. A specular reflection layer configured to reflect light may be arranged below the circuit cover plate, and the light source, the optical sensing device and the fingerprint sensor may be positioned below the specular reflection layer; and the light source and the optical sensing device may be positioned on two sides of the fingerprint sensor respectively. Light emitted by the light source may pass through a gap between the fingerprint sensor and the circuit cover plate to irradiate the specular reflection layer, and may be reflected to the optical sensing device through the specular reflection layer. The optical sensing device may be configured to convert the light emitted by the light source and reflected by the specular reflection layer into an electrical signal, and the electrical signal may be configured for force touch control.

According to a second aspect of the present disclosure, a force touch control method is provided, which may be applied to a terminal with the fingerprint circuit of the first aspect. The method may include: position information of an optical sensing device for generating an electrical signal based on light is acquired, and it is detected whether a reflection position of the light changes or not according to the position information; when the reflection position of the light changes, position difference information before and after the reflection position of the light changes is acquired; a force magnitude is calculated according to the position difference information; and force touch control is performed according to the calculated force magnitude.

According to a third aspect of the present disclosure, a force touch control device is provided, which may be applied to a terminal with the fingerprint circuit of the first aspect. The device may include: a first acquisition module, configured to acquire position information of an optical sensing device for generating an electrical signal based on light; a detection module, configured to detect whether a reflection position of the light changes or not according to the position information; a second acquisition module, configured to, when the reflection position of the light changes, acquire position difference information before and after the reflection position of the light changes; a calculation module, configured to calculate a force magnitude according to the position difference information; and a control module, configured to perform force touch control according to the calculated force magnitude.

According to a fourth aspect of the present disclosure, a force touch control device is provided. The device may include: fingerprint circuit; a processor; and a memory configured to store instructions executable by the processor. The processor may be configured to: acquire position information of an optical sensing device for generating an electrical signal base on light, and detect whether a reflection position of the light changes or not according to the position information; when the reflection position of the light changes, acquire position difference information before and after the reflection position of the light changes; calculate a force magnitude according to difference information; and perform force touch control according to the calculated force magnitude.

According to a fifth aspect of the present disclosure, a computer-readable storage medium is provided having at least one instruction, at least one program, a code set or an instruction set may be stored therein, the at least one instruction, the at least one program, the code set or the instruction set being loaded and executed by a processor to implement the force touch control method of the second aspect.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodi

DETAILED DESCRIPTION

In order to make the purpose, technical solutions and advantages of the present disclosure clearer, implementation modes of the present disclosure will further be described below in combination with the accompanying drawings in detail.

Reference will now be made in detail to examples, examples of which are illustrated in the accompanying drawings. The following description refers to the accompanying drawings in which the same serial numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

For a terminal, a conventional physical key is gradually disappearing from sights of consumers. Each of the major terminal manufacturers is actively trying a "keyless" design of mobile phones. Emergence of force touch control undoubtedly provides a sufficient technical support for such a design concept. In addition, a fingerprint may be used as one of biological characteristics for identity recognition due to its uniqueness. In a main existing model of each of the main terminal manufacturers, fingerprint recognition has become an indispensable configuration. A fingerprint circuit is intended to implement recognition of an individual fingerprint characteristic through a specific sensing module. That is, each fingerprint terminal may have a fingerprint circuit, the module collects and converts a fingerprint of a user into data, and the data is stored in a specific storage region of the terminal for calling when necessary. Under restrictions on a process and design for an existing fingerprint circuit, the existing fingerprint circuit is relatively undiversified in function. Therefore, integrating a force touch function and a fingerprint circuit based on an improvement in the fingerprint circuit is a feasible technical solution provided for integration of a terminal product design and diversification of functions at present.

In view of this, the present disclosure provides a fingerprint circuit. A light source and optical sensing device configured to implement force touch control are integrated in the fingerprint circuit, so that force touch control may be implemented without another peripheral component as a reference. As such, design flexibility is improved and difficulties in production and manufacturing of the whole machine are reduced. Moreover, performance and parameter fluctuations caused by an external factor such as assembly in a later stage are also avoided, and stability of force touch control is further improved. The fingerprint circuit provided by the present disclosure will now be introduced through the following contents in detail.

Figure 1:
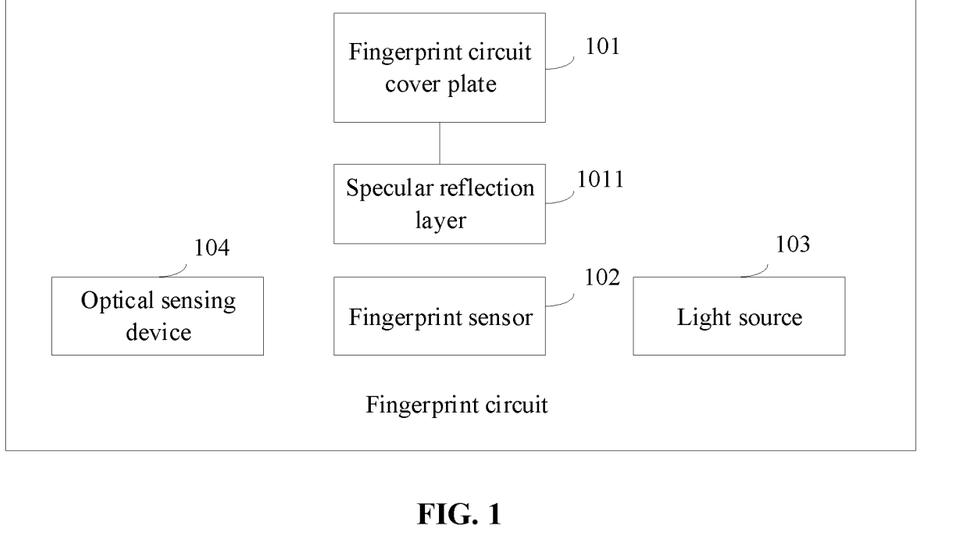
- FIG. 1 is a structure diagram of a fingerprint circuit according to an example.

Referring to FIG. 1, the present disclosure provides a fingerprint circuit. The fingerprint circuit is applied to a terminal, and includes a fingerprint circuit cover plate 101, a fingerprint sensor 102, a light source 103, and an optical sensing device 104.

A specular reflection layer 1011 configured to reflect light is arranged below the fingerprint circuit cover plate 101. The light source 103, the optical sensing device 104 and the fingerprint sensor 102 are positioned below the specular reflection layer 1011. The light source 103 and the optical sensing device 104 are respectively positioned on two sides of the fingerprint sensor 102.

Light emitted by the light source 103 passes through a gap between the fingerprint sensor 102 and the fingerprint circuit cover plate 101 to be irradiated onto the specular reflection layer 1011, and the light is then reflected to the optical sensing device 104 through the specular reflection layer 1011.

The optical sensing device 104 is configured to convert the light emitted by the light source 102 and reflected by the specular reflection layer 1011 into an electrical signal, and the electrical signal is configured for force touch control.

During a practical application, the fingerprint circuit cover plate 101, the fingerprint sensor 102, the light source 103, and the optical sensing device 104 are encapsulated in the fingerprint circuit. The fingerprint circuit cover plate 101 includes a fingerprint sensing region. A glass cover plate may be adopted around the fingerprint sensing region. In addition, in the fingerprint circuit provided by the present disclosure, the light source 103 and the optical sensing device 104 are cooperatively used to reflect a force magnitude, and the fingerprint sensor 102 is configured to realize a fingerprint recognition function. Therefore, a photoelectric hybrid force touch control fingerprint circuit is implemented.

Specific positions of the light source 103 and the optical sensing device 104 are also not limited in the present disclosure. In implementing, the light source 103 and the optical sensing device 104 may be arranged on the two sides of the fingerprint sensor 102 respectively. Optionally, the optical sensing device 104 includes a photodiode array. However, types and model of photodiodes are not limited in the present disclosure. Further, a position, shape and size of the photodiode array are not limited in the present disclosure, as long as a function of the optical sensing device 104 in the fingerprint circuit may be realized and a design requirement may be met.

For example, if the light source 103 is arranged on the left side of the fingerprint sensor 102, the photodiode array is correspondingly arranged on the right side of the fingerprint sensor 102. If the light source 103 is arranged on the right side of the fingerprint sensor 102, the photodiode array is correspondingly arranged on the left side of the fingerprint sensor 102. During a practical application, the photodiode array may be arranged on the same plane with the fingerprint sensor 102. For example, the photodiode array is arranged on a circuit board where the fingerprint sensor 102 is positioned. Photodiode arrays with different shapes and different sizes are selected as the sensing region implementing force touch control in the fingerprint circuit.

Optionally, the fingerprint sensor 102 includes, but not limited to, a capacitive fingerprint sensor.

Optionally, the light emitted by the light source 103 is further irradiated to a central region of the specular reflection layer 1011. The central region may include an active sensing region that includes the fingerprint sensing region of the fingerprint circuit cover plate 101, so that sensitivity and sensing level of force touch are maximally improved. Herein, the light source 103 may be a Light-Emitting Diode (LED) light source, and a light source type and model of the light source 103 are not limited in the present disclosure, as long as a function of the light source 103 in the fingerprint circuit may be realized and the design requirement may be met. During a practical application, LEDs with different models may be selected as the light source.

Figure 2:
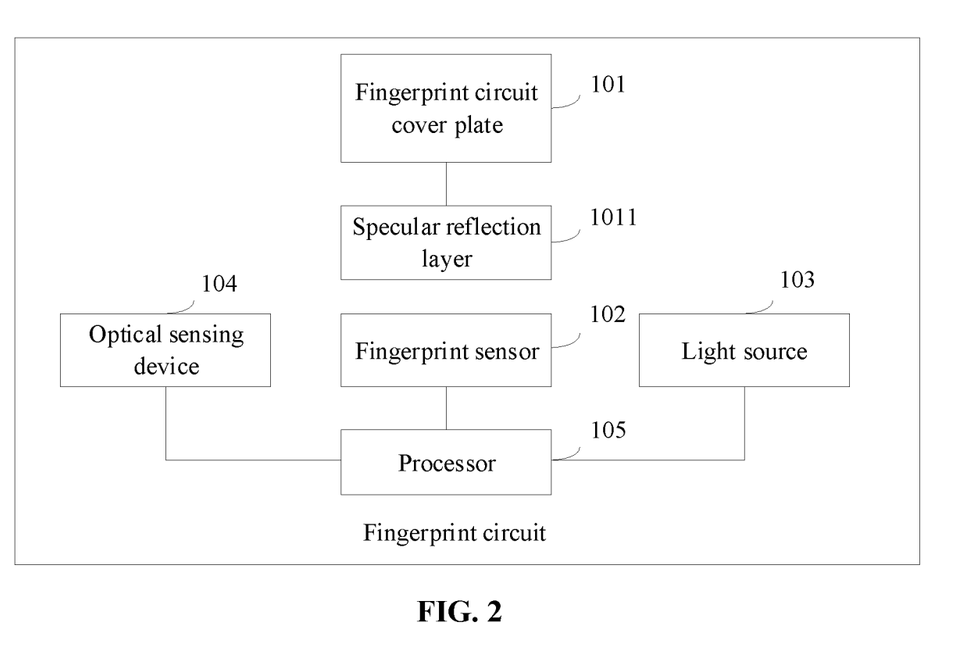
FIG. 2 is a structure diagram of another fingerprint circuit according to an example.

Optionally, referring to FIG. 2, the fingerprint circuit provided by the present disclosure further includes a processor 105. As shown in FIG. 2, the processor 105 is connected with the light source 103, the optical sensing device 104 and the fingerprint sensor 102. During a practical application, the processor 105 may control a light emitting frequency and time of the light source 103, and for example, controls the light source 103 to emit the light according to a preset time interval. The preset time interval may be 1 second, 2 seconds or the like, and the light emitting frequency and time of the light source 103 are not limited in the present disclosure. The processor 105 may further process a sensing parameter of the fingerprint sensor 102 to implement fingerprint recognition. In addition, the processor 105 may further acquire the electrical signal and position information of the optical sensing device 104 to further implement force touch control.

It is noted that, under the condition that the fingerprint circuit shown in FIG. 1 does not include the processor 105, the light source 103, the optical sensing device 104 and the fingerprint sensor 102 are connected with a processor positioned outside the fingerprint circuit in the terminal respectively, and the processor positioned outside the fingerprint circuit in the terminal realizes a function of the processor 105. That is, the processor 105 is an optional device of the fingerprint circuit, and the function of the processor 105 may be realized in the fingerprint circuit, and may also be realized outside the fingerprint circuit.

Figure 3:
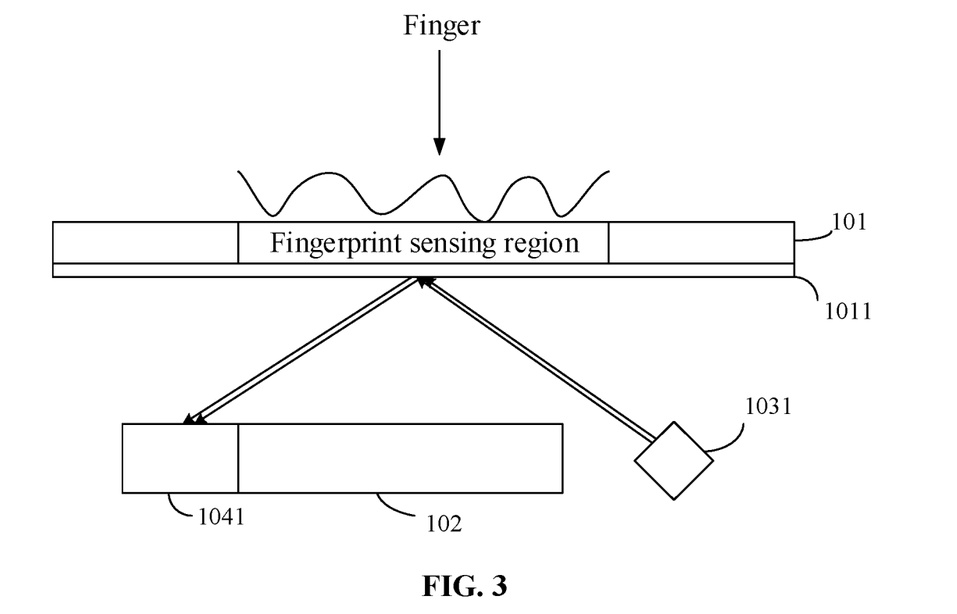
FIG. 3 is a structure diagram of another fingerprint circuit according to an example.

Based on the above introductions to FIG. 1 and FIG. 2, for example, if the fingerprint sensor 102 is a capacitive fingerprint sensor, the optical sensing device 104 is a photodiode array 1041 and the light source 103 is an LED light source 1031, when the fingerprint circuit provided by the present disclosure is not pressed with a finger, the fingerprint circuit may be shown in FIG. 3. In FIG. 3, since the fingerprint circuit cover plate 101 is not deformed, light emitted by the LED light source 1031 is then irradiated to the specular reflection layer 1011, and the light may be totally reflected by the specular reflection layer 1011, and then may be irradiated to the photodiode array 1041. As an optional embodiment, the light emitted by the LED light source 1031 may irradiate the middle position of the specular refection layer 1011, that is, the LED light source 1031 is arranged in a manner that the emitted light may irradiate the middle position of the specular reflection layer 1011, so that the sensitivity and sensing level of force touch are maximally improved. In addition, an irradiated coordinate of the photodiode array 1041 may be configured to feed back position information, a diode in the photodiode array 1041 may convert the light into an electrical signal such as a current or a voltage according to a using manner, the electrical signal may reflect the current or voltage in the photodiode, and then an index (for example, an optical distance and a light intensity) of the light may be calculated. After receiving the reflected light, the photodiode may feed back its position information and the electrical signal to the processor. Therefore, the processor records an initial value according to the electrical signal and position information fed back by the photodiode, and the initial value may be configured to reflect an initial force value of the fingerprint circuit.

Figure 4:
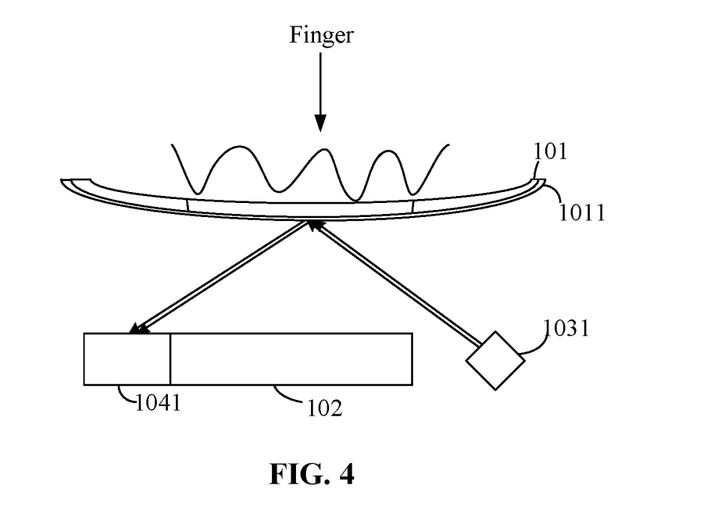
FIG. 4 is a structure diagram of another fingerprint circuit according to an example.

When being pressed with the finger, the fingerprint circuit may be shown in FIG. 4, wherein the fingerprint circuit cover plate 101 is deformed due to pressing of the finger, the light emitted by the LED light source 1031 may still irradiate the specular reflection layer 1011, but an irradiation position changes, so that a position, irradiated by the light which is totally reflected by the specular reflection layer 1011, on the photodiode array 1041 also changes. A coordinate of an irradiated diode in the photodiode array 1041 may be configured to feed back position information, the diode in the photodiode array 1041 may convert the light into an electrical signal such as a current or a voltage according to the using manner, the electrical signal may reflect the current or voltage in the photodiode, and then an index (for example, an optical distance and a light intensity) of the light may be calculated. After receiving the reflected light, the photodiode may feed back its position information and the electrical signal to the processor. Therefore, the processor may record an update value for the electrical signal and position information fed back by the photodiode, compare the update value with the initial value recorded according to the electrical signal and position information fed back last time to obtain a change value, and determine a force change of the fingerprint circuit according to the change value.

Figure 5:
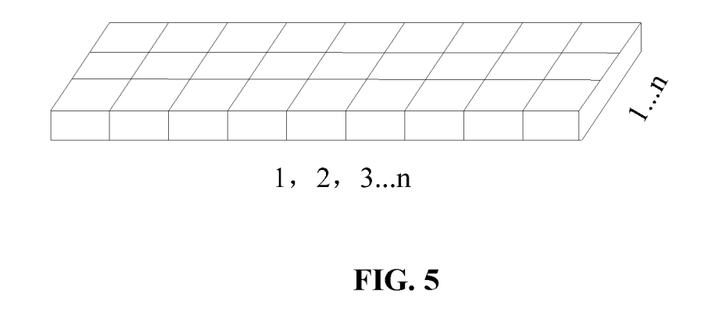
FIG. 5 is a structure diagram of a photodiode array according to an embodiment of the present disclosure.

Optionally, the photodiode array 1041 shown in FIG. 3 and FIG. 4 may be shown in FIG. 5, and the photodiode array 1041 may include n*n photodiodes, and namely include n photodiodes in both transverse and longitudinal directions. A specific value of n is not limited in the present disclosure.

In addition, it is only an example that the fingerprint circuit provided by the present disclosure includes the abovementioned devices. During a practical application, other devices may further be extended in combination with a specific product. There are no limits made in the present disclosure.

According to the fingerprint circuit provided by the present disclosure, the light source and optical sensing device configured to implement force touch control are arranged in the fingerprint circuit, and force touch control may be implemented without another peripheral component as a reference. The design flexibility is improved. The difficulties in production and manufacturing of the whole machine are reduced. Moreover, the performance and parameter fluctuations caused by the external factor such as assembly in the later stage are also avoided, and the stability of force touch control is further improved. In addition, the light emitted by the light source is further irradiated to the central region of the specular reflection layer, so that the sensitivity and sensing level of force touch may maximally be improved.

Figure 6:
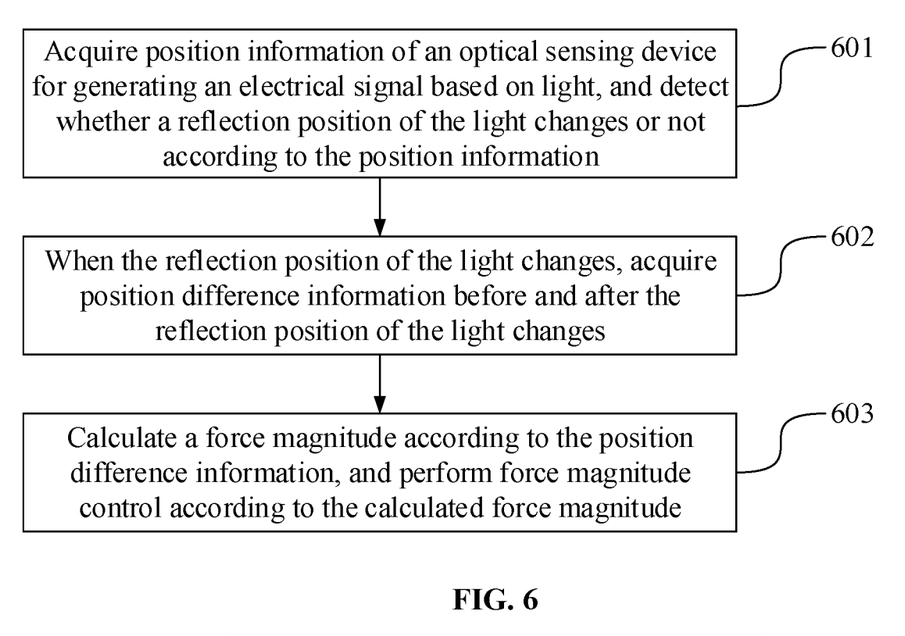
FIG. 6 is a flow chart showing a force touch control method according to an example.

Based on the fingerprint circuit shown in any one of FIG. 1-FIG. 5, the present disclosure provides a force touch control method. The method may be implemented by the processor in the fingerprint circuit, and may also be implemented by the processor positioned outside the fingerprint circuit in the terminal. Referring to FIG. 6, the method includes the following steps.

In 601, position information of an optical sensing device for generating an electrical signal based on light is acquired, and it is detected whether a reflection position of the light changes or not according to the position information.

Optionally, after a position of an optical sensing device array is fixed, a coordinate of each optical sensing device may also be determined. For example, each optical sensing device may be numbered in advance, and different serial numbers of the optical sensing devices correspond to different coordinates of the optical sensing devices. Therefore, a relationship between a serial number of an optical sensing device and a coordinate of the optical sensing device may be determined in advance. For convenient understanding, a 3*3 photodiode array is taken as an example. The 3*3 photodiode array includes 9 photodiodes, each photodiode has its own serial number, and there exists a relationship between a serial number and a coordinate. For example, the serial numbers of the photodiodes are 1, 2, 3, 4, 5, 6, 7, 8 and 9 respectively, the serial number 1 corresponds to a coordinate (1,1), the serial number 2 corresponds to a coordinate (1,2), the serial number 3 corresponds to a coordinate (1,3), the serial number 4 corresponds to a coordinate (2,1), the serial number 5 corresponds to a coordinate (2,2), the serial number 6 corresponds to a coordinate (2,3), the serial number 7 corresponds to a coordinate (3,1), the serial number 8 corresponds to a coordinate (3,2), and the serial number 9 corresponds to a coordinate (3,3).

When there is light irradiating, the optical sensing device may convert the light into an electrical signal such as a current signal or a voltage signal, so that the processor, every time when detecting an electrical signal, may acquire position information of the optical sensing device for generating the electrical signal based on the light according to the relationship between the serial number of the optical sensing device and the coordinate of the optical sensing device. For example, a serial number of the optical sensing device for generating the electrical signal based on the light may be determined at first. Since there exists the relationship between the serial number of the optical sensing device and the coordinate of the optical sensing device, a coordinate of the optical sensing device for generating the electrical signal based on the light may be acquired according to the serial number of the optical sensing device for generating the electrical signal based on the light. Finally, the position information of the optical sensing device for generating the electrical signal based on the light is acquired according to the coordinate of the optical sensing device for generating the electrical signal based on the light.

For convenient understanding, the 3*3 photodiode array is still taken as an example. If an electrical signal of the photodiode with No. 5 is received, it may be determined that the coordinate of the optical sensing device for generating the electrical signal based on the light is (2,2), and the coordinate (2,2) may be determined as the position information of the optical sensing device for generating the electrical signal based on the light.

Furthermore, when a fingerprint circuit cover plate is pressed with a finger, a force may be generated, and the fingerprint circuit cover plate is deformed by the force. Although incident light of a light source is kept unchanged, a light path of reflected light may be changed by deformation of the fingerprint circuit cover plate, and then an irradiation position on the photodiode array may change, as shown in FIG. 4. After the irradiation position of the light on the photodiode array changes, a position of the optical sensing device generating the electrical signal based on the light may also change, so that the position of the optical sensing device for generating the electrical signal may reflect whether the reflection position of the light change or not. That is, by adopting the force touch control method provided by the present disclosure, the fingerprint circuit may be detect whether the reflection position of the light changes or not according to the position information. As an optional mode, the operation it is detected whether the reflection position of the light changes or not according to the position information includes that:

the position information, acquired at a first time point, of the optical sensing device for generating the electrical signal is compared with position information, acquired at a second time point, of the optical sensing device for generating the electrical signal. When there is a difference between the position information acquired at the first and second time points, it is detected that the reflection position of the light changes.

For example, the optical sensing device is a 10*10 photodiode array. When the fingerprint circuit cover plate is not pressed with the finger, the light emitted by the light source is reflected onto photodiodes of which coordinates are (4,5), (4,6), (4,7), (5,5), (5,6), (5,7), (6,5), (6,6) and (6,7) through a specular reflection layer, and these photodiodes irradiated by the light may convert the light into electrical signals such as currents or voltages and feed back the electrical signals and their position information to the processor together. The processor acquires the position information of the photodiodes for generating the electrical signals based on the light. When the fingerprint circuit cover plate is pressed with the finger, the light emitted by the light source is reflected onto photodiodes of which coordinates are (4,4), (4,5), (4,6), (5,4), (5,5), (5,6), (6,4), (6,5) and (6,6) through the specular reflection layer, and these photodiodes irradiated by the light may convert the light into electrical signals such as currents or voltages and feed back the electrical signals and their position information to the processor of the terminal together. Herein, the position information may be their coordinates. The processor acquires the position information of the photodiodes for generating the electrical signals based on the light. When determining that the position information acquired at two times are inconsistent, that is, a difference exists, the processor may accordingly determine that the reflection position of the light changes.

In 602, when the reflection position of the light changes, position difference information before and after the reflection position of the light changes is acquired.

Here, a change in the position information of the photodiode for generating the electrical signal based on the light may reflect a change in the reflection position of the light. The optical sensing device may obtain a first position information at a first time point and a second position information at a second time point based on the reflection positions of the light. Thus, when the position difference information before and after the reflection position of the light changes is acquired, a difference value between the first position information, acquired this time (a first time point), and the second position information, acquired last time (a second time point), may be determined as the position difference information before and after the reflection position of the light changes.

For example, as illustrated in the example of Step 601, a difference value between the position information is acquired at two times, i.e. the position information (i.e. the coordinates) of the photodiodes of which the coordinates are (4,5), (4,6), (4,7), (5,5), (5,6), (5,7), (6,5), (6,6) and (6,7) and the position information (i.e. the coordinates) of the photodiodes of which the coordinates are (4,4), (4,5), (4,6), (5,4), (5,5), (5,6), (6,4), (6,5) and (6,6), which is a coordinate. That is, the light is leftwards deviated by a unit distance in a coordinate, and then, it may be determined that the position difference information before and after the reflection position of the light changes is a unit distance in the coordinate.

In 603, a force magnitude is calculated according to the position difference information, and force touch control is performed according to the calculated force magnitude.

Herein, different position difference information corresponds to different force magnitudes. As an optional mode, a force magnitude corresponding to the position difference information may be preset, precalculated, or prestored. For example, when the position difference information is a distance of a coordinate, the force magnitude is a unit. When the position difference information is a distance of two coordinates, the force has a magnitude of two units, and so on.

In the method provided by the present disclosure, for controlling the terminal to execute different functions according to different force touches, functions corresponding to different forces may be preset. Therefore, as an optional mode, when force touch control is performed according to the calculated force magnitude, a function corresponding to the calculated force magnitude may be determined, and the terminal is controlled to execute the function corresponding to the force magnitude. Herein, before the function corresponding to the calculated force magnitude is determined, functions corresponding to different force magnitudes may be preset to obtain a relationship between a force magnitude and a function. Therefore, after the force magnitude is calculated, the preset relationship is queried to obtain the function corresponding to the force magnitude.

For example, it may be preset that a force which is 1 unit corresponds to a first function, a force which is 2 units corresponds to a second function, and so on. Then, if the currently calculated force magnitude is 2 units, the determined function is the second function, and the terminal may be controlled to execute the second function.

In addition, there may be an error about the force magnitude, force magnitudes within a certain range may be set to correspond to the same function. For example, it is preset that forces with 1 unit to 3 units correspond to the first function, forces with 4 units to 6 units correspond to the second function, and so on. Then, if the currently calculated force magnitude is 2 units, the determined function is the first function, and the terminal may be controlled to execute the first function.

Of course, the operations that the force magnitude is calculated according to the position difference information, the function corresponding to the force magnitude is set or the like are only examples. During a practical application, another manner may further be adopted to calculate the force magnitude and determine the function corresponding to the force magnitude, which will not be limited in the present disclosure.

According to the present disclosure, the light source and the optical sensing device are arranged in the fingerprint circuit. The fingerprint circuit may determine whether the reflection position of the light changes or not according to the position information generated by the optical sensing device, where the optical sensing device generates the electrical signal based on the light. Therefore, the fingerprint circuit may determine a force change and implement force touch control. Thus, force touch control may be implemented without another peripheral component as a reference. Design flexibility is improved and difficulties in production and manufacturing of the whole machine are reduced. Moreover, performance and parameter fluctuations caused by an external factor such as assembly in a later stage are also avoided, and stability of force touch control is further improved. In addition, the light emitted by the light source is irradiated to the central region of the specular reflection layer, so that sensitivity and sensing level of force touch may be improved.

Figure 7:
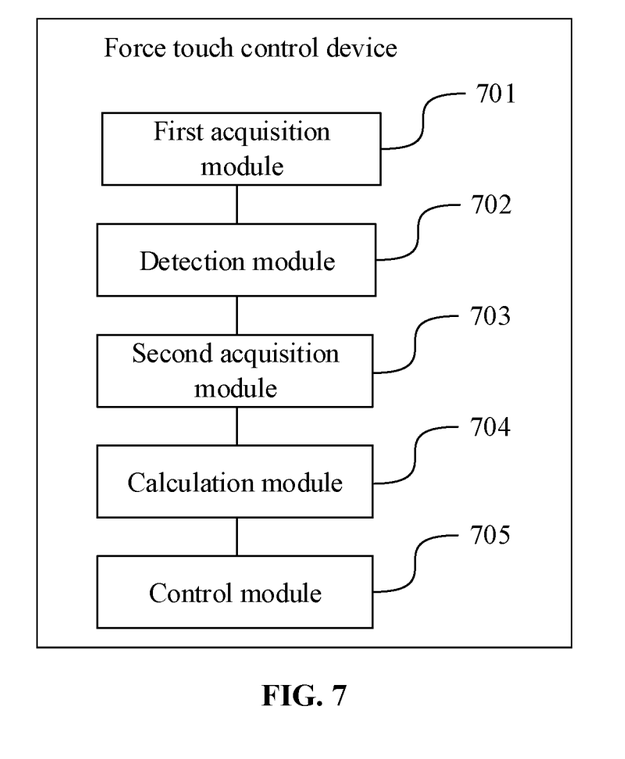
FIG. 7 is a structure diagram of a force touch control device according to an example.

Referring to FIG. 7, the present disclosure provides a force touch control device. The device is applied to a terminal with the abovementioned fingerprint circuit. As shown in FIG. 7, the device includes:

a first acquisition module 701, configured to acquire position information of an optical sensing device for generating an electrical signal based on light;

a detection module 702, configured to detect whether a reflection position of the light changes or not according to the position information;

a second acquisition module 703, configured to, when the reflection position of the light changes, acquire position difference information before and after the reflection position of the light changes;

a calculation module 704, configured to calculate a force magnitude according to the position difference information; and a control module 705, configured to perform force touch control according to the calculated force magnitude.

Optionally, the first acquisition module 701 is configured to determine a serial number of the optical sensing device for generating the electrical signal based on the light, there existing a relationship between a serial number of an optical sensing device and a coordinate of the optical sensing device; acquire a coordinate of the optical sensing device for generating the electrical signal based on the light according to the serial number of the optical sensing device for generating the electrical signal based on the light; and acquire the position information of the optical sensing device for generating the electrical signal based on the light according to the coordinate of the optical sensing device generating the electrical signal based on the light.

Optionally, the detection module 702 is configured to compare the position information, acquired this time, of the optical sensing device for generating the electrical signal with position information, acquired last time, of the optical sensing device for generating the electrical signal; and when there is a difference, detect that the reflection position of the light changes.

Optionally, the control module 705 is configured to determine a function corresponding to the calculated force magnitude; and control the terminal to execute the function corresponding to the force magnitude.

According to the force touch control device provided by the present disclosure, force touch control is implemented through a light source and optical sensing device arranged in the fingerprint circuit, and force touch control may be implemented without another peripheral component as a reference, so that performance and parameter fluctuations caused by an external factor such as assembly in a later stage are also avoided, and stability of force touch control is further improved. In addition, the light emitted by the light source is irradiated to a middle position of a specular reflection layer, so that force touch control is performed according to the force magnitude calculated according of the position information before and after the reflection position of the light changes, and sensitivity and sensing level of force touch may maximally be improved. Here, the middle position may also be called a central region.

Here, each module in this disclosure may be at least partially implemented using one or more circuit components. With respect to the devices in the above embodiments, the specific manners for performing operations for individual modules therein have been described in detail in the embodiments regarding the methods, which will not be elaborated herein.

Figure 8:
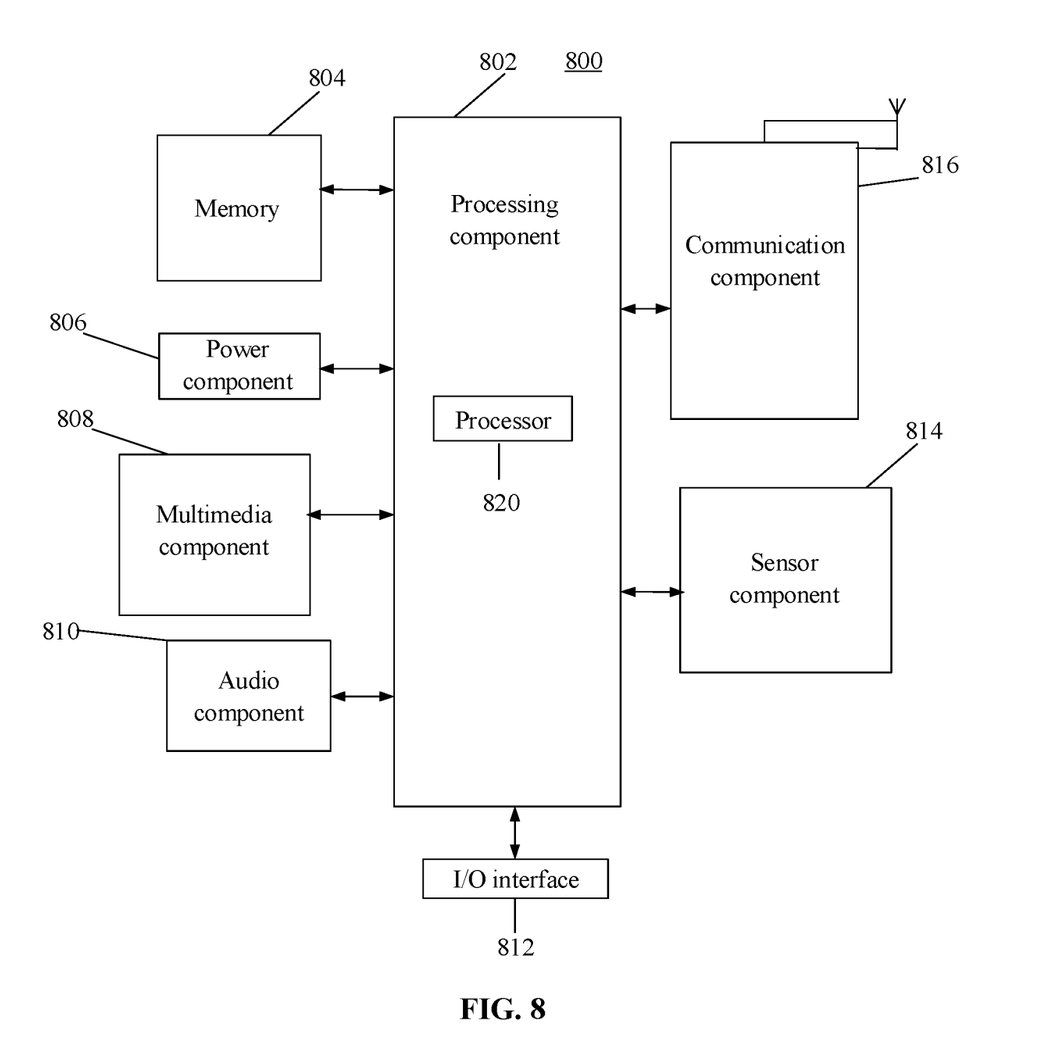
FIG. 8 is a structure diagram of a terminal according to an example.

FIG. 8 is a block diagram of a terminal 800 according to an example. For example, the terminal 800 may be a mobile phone, a computer, a digital broadcast terminal, a messaging device, a gaming console, a tablet, a medical device, exercise equipment, a personal digital assistant, or the like.

Referring to FIG. 8, the terminal 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the terminal 800. Examples of such data include instructions for any application programs or methods operated on the terminal 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the terminal 800. The power component 806 may include a power management system, one or more power supplies, and other components associated with the generation, management and distribution of power for the terminal 800.

The multimedia component 808 includes a screen providing an output interface between the terminal 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 808 includes a front camera and/or a rear camera. The front camera and/or the rear camera may receive external multimedia data when the terminal 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal 800 is in the operation mode, such as a call mode, a recording mode and a voice recognition mode. The received audio signal may be further stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button or the like. The button may include, but not limited to: a home button, a volume button, a starting button and a locking button.

The sensor component 814 includes one or more sensors configured to provide status assessment in various aspects for the terminal 800. For instance, the sensor component 814 may detect an on/off status of the terminal 800 and relative positioning of components, such as a display and small keyboard of the terminal 800, and the sensor component 814 may further detect a change in a position of the terminal 800 or a component of the terminal 800, presence or absence of contact between the user and the terminal 800, orientation or acceleration/deceleration of the terminal 800 and a change in temperature of the terminal 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the terminal 800 and other equipment. The terminal 800 may access a communication-standard-based wireless network, such as a Wireless Fidelity (WiFi) network, a 2nd-Generation (2G) or 3rd-Generation (3G) network or a combination thereof. In an example, the communication component 816 receives a broadcast signal or broadcast associated information from an external broadcast management system through a broadcast channel. In an example, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an example, the terminal 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned force touch control method.

In an example, there is also provided a non-transitory computer-readable storage medium including an instruction, such as the memory 804 including an instruction, and the instruction may be executed by the processor 820 of the terminal 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment or the like. The instruction in the storage medium is executed by the processor of the terminal to enable the terminal to execute the abovementioned force touch control method.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A fingerprint circuit, applied to a terminal and comprising:
   a circuit cover plate, a fingerprint sensor, a light source, and an optical sensing device, wherein a specular reflection layer configured to reflect light is arranged below the circuit cover plate;
   wherein the light source, the optical sensing device, and the fingerprint sensor are positioned below the specular reflection layer;
   wherein the light source and the optical sensing device are respectively positioned on two sides of the fingerprint sensor;
   wherein light emitted by the light source passes through a gap between the fingerprint sensor and the circuit cover plate to irradiate the specular reflection layer, and the light is reflected to the optical sensing device through the specular reflection layer; and
   wherein the optical sensing device is configured to convert the light emitted by the light source and reflected by the specular reflection layer into an electrical signal that reflects a current or a voltage in a photodiode of the optical sensing device, and the electrical signal is configured for force touch control.

2. The fingerprint circuit of claim 1, wherein the optical sensing device comprises a photodiode array.

3. The fingerprint circuit of claim 1, wherein the fingerprint sensor is a capacitive fingerprint sensor.

4. The fingerprint circuit of claim 1, wherein the light emitted by the light source irradiates to a central region of the specular reflection layer.

5. The fingerprint circuit of claim 1, further comprising a processor that is connected with the light source, the optical sensing device, and the fingerprint sensor.

6. A force touch control method, applied to a terminal comprising a fingerprint circuit that comprises a circuit cover plate, a fingerprint sensor, a light source, and an optical sensing device, and the method comprising:
   acquiring position information of the optical sensing device for generating an electrical signal based on light, and detecting whether a reflection position of the light changes or not according to the position information;
   when the reflection position of the light changes, acquiring position difference information before and after the reflection position of the light changes;
   calculating a force magnitude according to the position difference information; and
   performing force touch control according to the calculated force magnitude,
   wherein a specular reflection layer configured to reflect light is arranged below the circuit cover plate;
   wherein the light source, the optical sensing device, and the fingerprint sensor are positioned below the specular reflection layer;
   wherein the light source and the optical sensing device are respectively positioned on two sides of the fingerprint sensor; and
   wherein light emitted by the light source passes through a gap between the fingerprint sensor and the circuit cover plate to irradiate the specular reflection layer, the light is reflected to the optical sensing device through the specular reflection layer, and the optical sensing device converts the light emitted by the light source and reflected by the specular reflection layer into the electrical signal that reflects a current or a voltage in a photodiode of the optical sensing device.

7. The method of claim 6, wherein the optical sensing device is configured to convert the light emitted by the light source and reflected by the specular reflection layer into the electrical signal, and the electrical signal is configured for the force touch control.

8. The method of claim 6, wherein acquiring the position information of the optical sensing device for generating the electrical signal based on the light comprises:
   determining a serial number of the optical sensing device for generating the electrical signal based on the light, there existing a relationship between a serial number of an optical sensing device and a coordinate of the optical sensing device;
   acquiring a coordinate of the optical sensing device for generating the electrical signal based on the light according to the serial number of the optical sensing device for generating the electrical signal based on the light; and
   acquiring the position information of the optical sensing device for generating the electrical signal based on the light according to the coordinate of the optical sensing device for generating the electrical signal based on the light.

9. The method of claim 6, wherein detecting whether the reflection position of the light changes or not according to the position information comprises:
   comparing the position information, acquired this time, of the optical sensing device for generating the electrical signal with position information, acquired last time, of the optical sensing device for generating the electrical signal; and
   when determining that there is a difference between the position information acquired at this time and the last time, determining that the reflection position of the light changes.

10. The method of claim 6, wherein performing force touch control according to the calculated force magnitude comprises:
    determining a function corresponding to the calculated force magnitude; and
    controlling the terminal to execute the function corresponding to the force magnitude.

11. A force touch control device, comprising:
    a fingerprint circuit,
    a processor; and a memory configured to store instructions executable by the processor, wherein the fingerprint circuit comprises a circuit cover plate, a fingerprint sensor, a light source, and an optical sensing device;

wherein a specular reflection layer configured to reflect light is arranged below the circuit cover plate;

wherein the light source, the optical sensing device, and the fingerprint sensor are positioned below the specular reflection layer;

wherein the light source and the optical sensing device are respectively positioned on two sides of the fingerprint sensor; and wherein light emitted by the light source passes through a gap between the fingerprint sensor and the circuit cover plate to irradiate the specular reflection layer, the light is reflected to the optical sensing device through the specular reflection layer, and the optical sensing device converts the light emitted by the light source and reflected by the specular reflection layer into an electrical signal that reflects a current or a voltage in a photodiode of the optical sensing device;

wherein the processor is configured to:

acquire position information of an optical sensing device for generating the electrical signal based on light, and detect whether a reflection position of the light changes or not according to the position information;

when the reflection position of the light changes, acquire position difference information before and after the reflection position of the light changes;

calculate a force magnitude according to difference information; and perform the force touch control according to the calculated force magnitude.

12. The device of claim 11, wherein the optical sensing device is configured to convert the light emitted by the light source and reflected by the specular reflection layer into the electrical signal, and the electrical signal is configured for the force touch control.

13. The device of claim 11, wherein the processor is further configured to determine a serial number of the optical sensing device for generating the electrical signal based on the light, there existing a relationship between a serial number of an optical sensing device and a coordinate of the optical sensing device;

acquire a coordinate of the optical sensing device for generating the electrical signal based on the light according to the serial number of the optical sensing device for generating the electrical signal based on the light; and acquire the position information of the optical sensing device for generating the electrical signal based on the light according to the coordinate of the optical sensing device for generating the electrical signal based on the light.

14. The device of claim 11, wherein the processor is further configured to:

compare the position information, acquired this time, of the optical sensing device for generating the electrical signal with position information, acquired last time, of the optical sensing device for generating the electrical signal; and when determine that there is a difference between the position information acquired at this time and the last time, determine that the reflection position of the light changes.

15. The device of claim 11, wherein the processor is further configured to:

determine a function corresponding to the calculated force magnitude; and control the terminal to execute the function corresponding to the force magnitude.

* * * * *